(12) United States Patent
Bishop

(10) Patent No.: US 12,310,302 B2
(45) Date of Patent: May 27, 2025

(54) VERTICAL CULTIVATION SYSTEM AND METHOD

(71) Applicant: Wayne Bishop, Woodlake, CA (US)

(72) Inventor: Wayne Bishop, Woodlake, CA (US)

( * ) Notice: Subject to any disclaimer, the term of this patent is extended or adjusted under 35 U.S.C. 154(b) by 0 days.

(21) Appl. No.: 18/141,989

(22) Filed: May 1, 2023

(65) Prior Publication Data

US 2023/0345892 A1  Nov. 2, 2023

Related U.S. Application Data

(60) Provisional application No. 63/337,061, filed on Apr. 30, 2022.

(51) Int. Cl.
*A01G 31/04* (2006.01)
(52) U.S. Cl.
CPC .................................. *A01G 31/047* (2013.01)
(58) Field of Classification Search
CPC ....................................................... A01G 31/047
See application file for complete search history.

(56) References Cited

U.S. PATENT DOCUMENTS

| | | | | |
|---|---|---|---|---|
| 4,317,308 A * | 3/1982 | Derrick | ................. | A01G 18/69 47/65 |
| 5,584,141 A * | 12/1996 | Johnson | ................... | A01G 9/00 47/65 |
| 7,168,206 B2 * | 1/2007 | Agius | ................. | A01G 31/042 47/62 R |
| 10,112,814 B1 * | 10/2018 | Shelor | ................... | A01G 22/00 |
| 12,114,619 B2 * | 10/2024 | Kulatunga | ........... | A01G 31/045 |
| 2014/0182197 A1 * | 7/2014 | Chung | ................ | A01G 31/045 47/1.7 |
| 2017/0118922 A1 * | 5/2017 | Sherertz | ............... | A01G 31/042 |
| 2019/0029200 A1 * | 1/2019 | Mawendra | ............ | A01G 9/243 |
| 2019/0335681 A1 * | 11/2019 | Oberthier | .............. | B65G 23/24 |
| 2022/0007595 A1 * | 1/2022 | Schroeder | ............ | A01G 31/047 |
| 2022/0087123 A1 * | 3/2022 | Deschambault | ........ | A01G 9/18 |
| 2023/0157220 A1 * | 5/2023 | Daoust | ................ | A01G 31/042 47/65 |

FOREIGN PATENT DOCUMENTS

| WO | WO-2011067548 A1 * | 6/2011 | ........... A01G 31/047 |
| WO | WO-2017137976 A1 * | 8/2017 | |

* cited by examiner

*Primary Examiner* — Christopher D Hutchens
*Assistant Examiner* — Edgar Reyes
(74) *Attorney, Agent, or Firm* — Cohen IP Law Group, PC; Michael N. Cohen

(57) ABSTRACT

A vertical cultivation system and method. The vertical cultivation system includes a vertical carousel with associated platforms that each hold a plant. The carousel moves the platforms through different levels during the daily growing cycle and the plants receive treatments at each level. The treatments include irrigation, lighting, environmental control, pest management, and deep-water culture. The movement of the carousel (e.g., its speed and rotational positioning) is controlled by a controller that receives input from sensors configured with the plants. The sensors communicate sensed readings (e.g., moisture levels) and the controller controls the carousel's movement based on the readings. When at ground level, the plants are held at a level that is ergonomic for pruning and other plant maintenance activities.

18 Claims, 3 Drawing Sheets

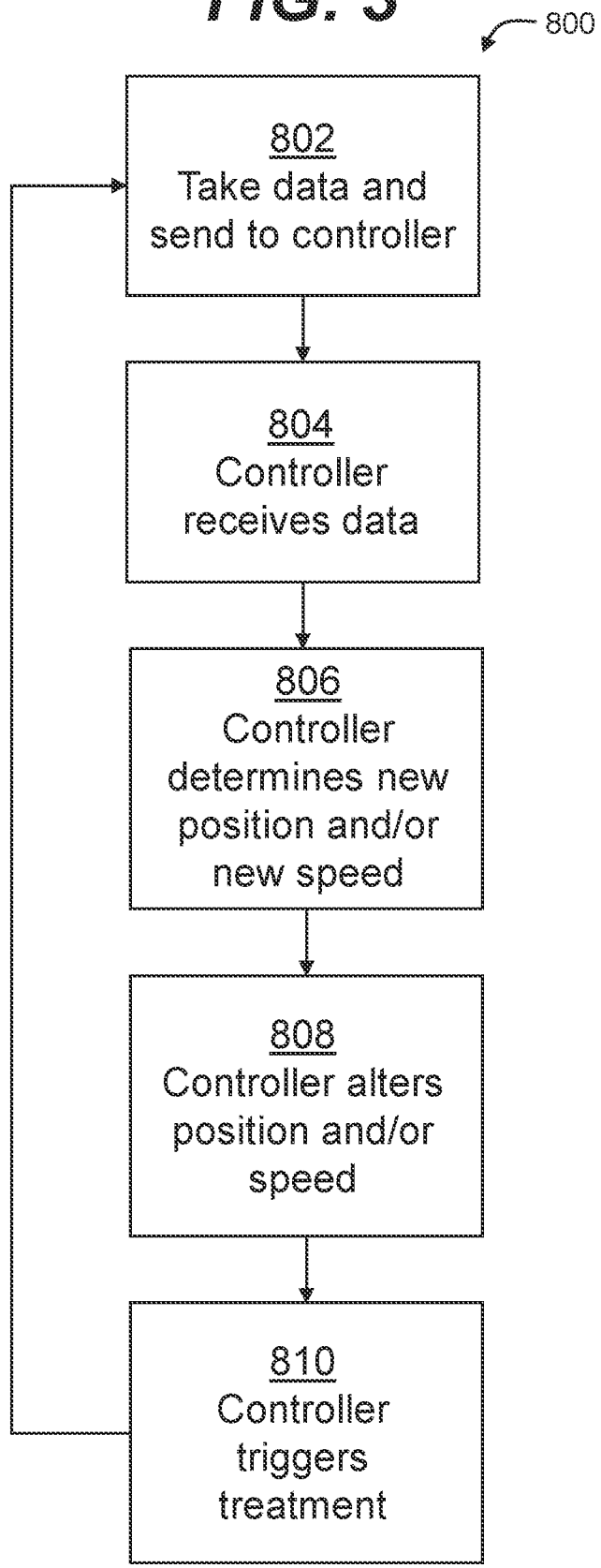

VERTICAL CULTIVATION SYSTEM AND METHOD

CROSS-REFERENCE TO RELATED APPLICATIONS

This application claims priority to U.S. Provisional Application No. 63/337,061, filed Apr. 30, 2022, the entire contents of which are hereby fully incorporated herein by reference for all purposes.

FIELD OF THE INVENTION

This invention relates to farming, including a vertical cultivation system and method.

BACKGROUND

Vertical farming is a multibillion-dollar industry worldwide. Accordingly, a wide variety of systems and technologies are available to support the vertical farming industry.

However, existing vertical farming systems lack several attributes, including, but not limited to, the ability to work on plants at ground level, a full-360° of lighting, fully automated irrigation systems, fully automated dry backs between irrigations, and other attributes.

Accordingly, there is a need for a vertical cultivation system and method that includes an automated carousel, lighting, and irrigation system.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 shows actions taken by a vertical cultivation system according to exemplary embodiments hereof.

DETAILED DESCRIPTION OF EXEMPLARY EMBODIMENTS

In general, the vertical cultivation system and method according to exemplary embodiments herein includes a vertical racking system configured with a carousel designed to maximize plant density within a room or space while providing proper lighting, irrigation, environmental control, pest management, and other attributes.

Figure 1:
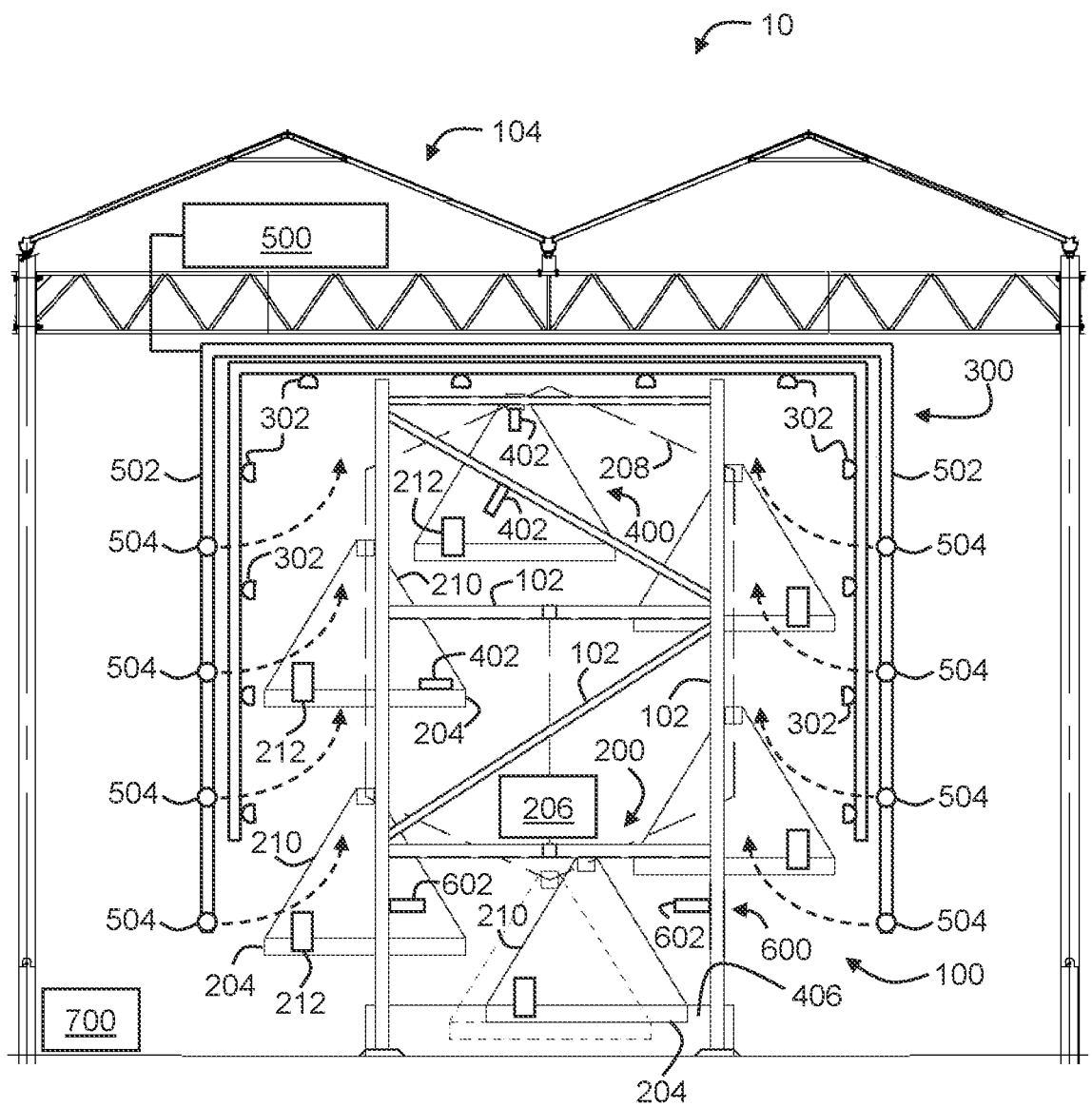
FIG. 1 shows aspects of a vertical cultivation system according to exemplary embodiments hereof.
Figure 2:
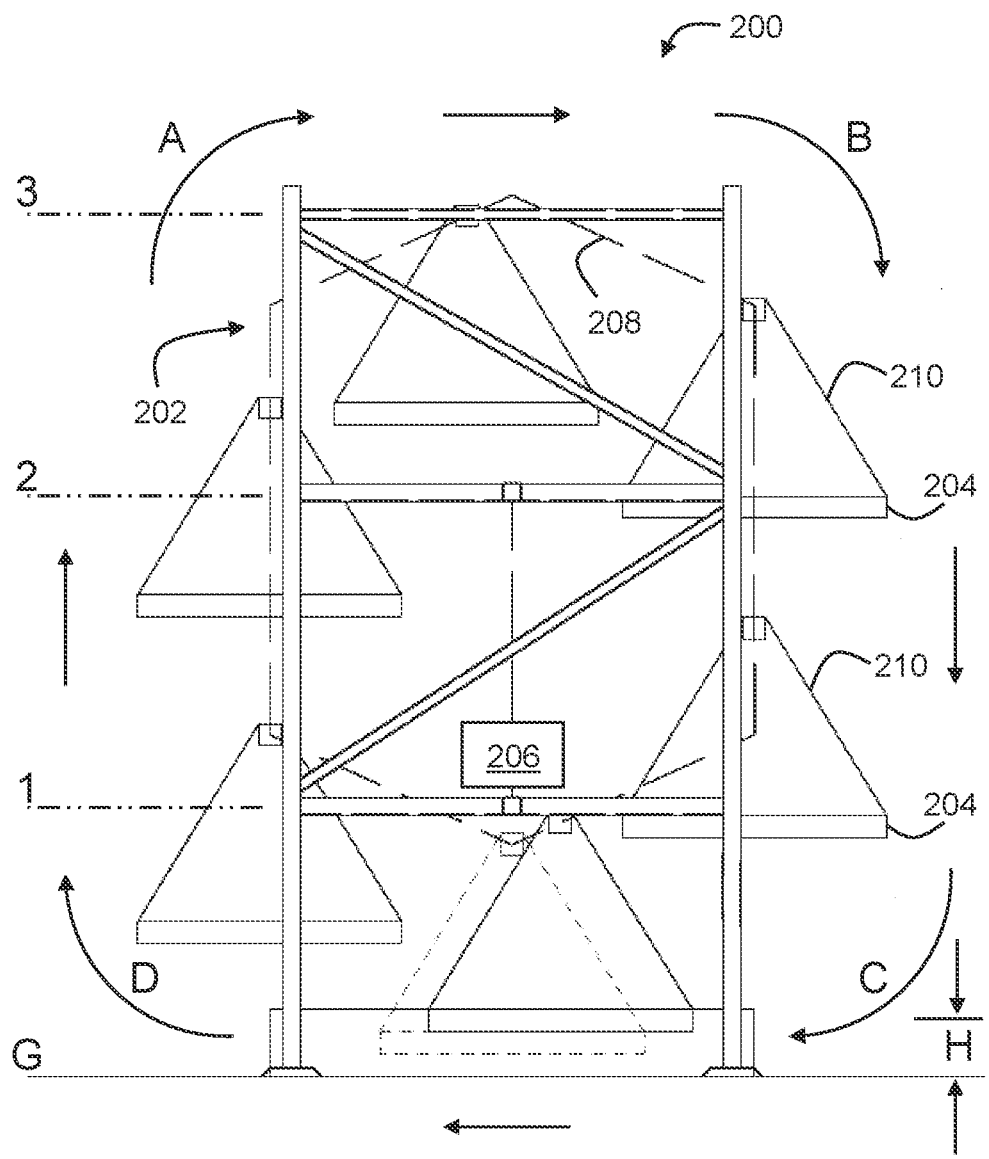
FIG. 2 shows aspects of a vertical carousel according to exemplary embodiments hereof.

In one exemplary embodiment hereof, as shown in FIGS. 1-2, the vertical cultivation system 10 (also referred to herein as simply the system 10) includes a frame assembly 100, a movement assembly 200, a lighting assembly 300, an irrigation assembly 400, a heating, ventilation, and air conditioning (HVAC) assembly 500, a pest management assembly 600, and a controller 700. In general, the movement assembly 200 includes a plurality of platforms configured generally as a vertical carousel, with each platform caused to move upward and downward along a predetermined path as desired. Plants to be cultivated are placed on the platforms and are provided with light, water, ventilation, and other essential elements during their growing cycle. The movement assembly 200 is controlled by the controller to move the platforms along a desired path and according to a predetermined schedule to interact with the other assemblies 300, 400, 500, and 600 to optimize the growing conditions as described herein. The system 10 also may include other elements and components as necessary for the system 10 to fulfill its intended functionalities.

In some embodiments, as shown in FIGS. 1-2, the frame assembly 100 includes a plurality of frame structures 102 (e.g., beams, posts, rods, cables, etc.) configured to generally support and house the other assemblies 200, 300, 400, 500, 600, 700 as needed. The frame structures 102 may be aligned vertically, horizontally, diagonally, and/or in any orientation a required. The frame assembly 100 may comprise metal, plastic, wood, composite materials, other suitable materials, and any combinations thereof. In addition, the frame assembly 100 may include and/or be configured with one or more foundations that may provide a base structure to the frame assembly 100.

In some embodiments, the frame assembly 100 also may include one or more greenhouses 104 and/or other building structures to generally house and protect the various assemblies 200, 300, 400 500, 600, 700 during use and/or for storage.

In some embodiments, as shown in FIGS. 1-2, the movement assembly 200 includes one or more vertical carousels 202 supporting one or more platforms 204. While six platforms 204 are shown in FIGS. 1-2, it is understood that any number of platforms 204 may be configured with each carousel 202. In some embodiments, each platform 204 is configured with the carousel 202 using one or more attachment structures 210 (e.g., wires, rods, beams, bolts, brackets, hinges, ball joints, etc.). In this way, the platforms 204 may generally hang from and/or be otherwise configured with the carousel 202 such that they may move in coordination with the carousel 202.

In some embodiments, as shown in FIGS. 1-2, the carousel 202 is caused to move (e.g., rotate) by a movement mechanism 206, such as an electric motor or other suitable movement mechanism. In some embodiments, as shown in FIG. 1, the movement mechanism 206 may be configured with a chain 208 (or other suitable tether mechanism) that drives the movement of the carousel 202. The chain 208 may be configured with one or more sprockets and/or other type(s) of chain support structures that support and guide the chain 208 about a predefined path during the rotation of the carousel 202.

In some embodiments, as described in other sections, the movement mechanism 206 is controlled by the controller 700. As such, the controller may cause the carousel 202 and the platforms 204 to move in a particular direction, at a particular time, and at a particular speed depending on sensed criteria.

In some embodiments, as shown in FIG. 2, the carousel 202 may be caused to move in a clockwise direction depicted by the arrows A, B, C, D, in a counterclockwise direction opposite the direction represented by the arrows A, B, C, D, and/or in any combinations of clockwise and/or counterclockwise directions. In this way, the platforms 204 and the plants also are caused to move in the directions of the arrow A, B, C, D (and/or in the opposite directions).

In some embodiments, the carousel 202 may be controlled to generally perform one full rotation of the platforms 204 over a 24-hour period. In some embodiments, as described in other sections, the controller 700 utilizes acquired data (e.g., from moisture sensors 212 as described below) to speed up and/or slow down the carousel speed to maintain a specific saturation of each plant's root zone and a proper dry back of the root zone over a 24-hour period.

In some embodiments, as shown in FIG. 2, the system 10 provides different treatments to the plants (on the platforms 204) when the plants are located in different positions (due to the rotation of the carousel 202) within the system 10. For example, FIG. 2 shows a carousel 202 with four general levels (also referred to as stages): ground level G, first level 1, second level 2, and third level 3. Other numbers of levels also may be used. In some embodiments, the ground level G may include heights of about 0' to 3', and preferably about 1.5', the first level 1 may include heights of about 5' to 7', and preferably about 6', the second level 2 may include heights of about 12' to 14' and preferably about 13', and the third level 3 may include heights of about 17' to 21' and preferably about 19.5'.

In some embodiments, each treatment (e.g., pruning, pest control, irrigation, dry back, etc.) is located at a particular level such that as the plants travel from level to level, the required treatments are performed in a predetermined and strategic order that coincides with the growing cycle of the plants. For example, in a preferred embodiment, a plant may be submerged in the deep-water culture assembly 406 when its respective platform 204 is located at the ground level G and may be treated by the pest management assembly 600 when its respective platform 204 is located at the ground level G and/or at the first level 1. The plant may then be irrigated when its respective platform 204 is located at the second level 2 and may be exposed to additional light for dry back when its respective platform 204 is located at the third level 3. Accordingly, the deep-water culture assembly 406 is preferably located at the ground level G, the pest management assembly 600 is preferably located at the ground level G and/or at the first level 1, the irrigation assembly 400 is preferably located at the second level 2, and the lighting assembly 300 is preferably located at the third level 3. This strategic placement of each assembly enables the system 10 to treat the plants in sequence as the plants travel along the carousel path. It is understood that the treatments and positions described in the above example are for demonstration and that the treatments may be performed to the plants at other positions along the carousel's path as desired.

In some embodiments, the movement assembly 200 includes one or more moisture sensors 212 configured with each plant on each platform 204 to sense (preferably in real time) the moisture content of the plant's growing media (e.g., the soil in which the plant is rooted). In some embodiments, the moisture sensors 212 are configured to communicate with the controller 700 (preferably wirelessly) and to trigger the controller 700 to cause the carousel 202 to move at a particular speed and in a particular direction upon the sensing of predefined moisture criteria. Each moisture sensor 212 preferably includes a unique identifier (e.g., a serial number) such that the controller 700 may correlate data received from a particular sensor 212 with the platform 204 (and plant) with which the sensor 212 is configured.

For example, the carousel 202 may be configured to continually move in a particular direction (e.g., clockwise, or counterclockwise) and the controller 700, upon receiving data from one or more sensors 212, may cause the carousel 202 to either speed up and/or to slow down. For example, if a moisture sensor 212 indicates that a plant's dry back process is happening quicker than normal, the controller 700 may cause the carousel 202 to move faster such that the plants move through the dry back section of the carousel path (e.g., through the third level 3) in less time thereby reducing the amount of time allocated for the dry back. In another example, if a sensor 212 indicates that additional time is needed for a particular dry back, the controller 700 may slow down the speed of the carousel 202 as it passes through the dry back section (e.g., through the third level 3) thereby causing the plant to spend more time in the dry back section. In another example, if a sensor 212 indicates that additional irrigation is required, the controller 700 may slow down the carousel 202 as the plant passes through the irrigation section (e.g., through the second level 2), and if the sensor 212 indicates that the irrigation level is sufficient, the controller 700 may speed up the carousel 202 such that the plant passes through the irrigation section and into the dry back section more quickly.

In another example, if a moisture sensor 212 determines that the moisture content of a particular plant's growing media is low and that the plant's platform 204 is located at a position that is not optimized for irrigation, the sensor 212 may communicate this information to the controller 700 that may then trigger the carousel 202 to move the particular platform 204 to a particular location (e.g., to level 2 as in the above example) where it may receive additional irrigation. Then, upon the sensor 212 sensing and conveying a moisture reading to the controller 700 that indicates the moisture level is within desired limits, the controller 700 may trigger the carousel 202 to move the platform 204 to a more lighted area (e.g., to level 3 as in the above example) where the plant may receive additional light for a dry back period.

Given the above, the movement of the carousel 202 is controlled and orchestrated with the irrigation assembly 400 and with the lighting assembly 300 via the moisture information in order to provide hydration and dry backs to maintain the desired irrigation strategies. For example, in some embodiments, the carousel 202 may be controlled to generally maintain 50% dry backs. In other embodiments, the system 10 may maintain 100% to 25% dry back. Other dry back periods also may be used. In addition, the triggered movements may be clockwise, counterclockwise, and/or any combinations thereof.

It is understood that the examples described above are meant for demonstration and that any moisture sensor 212 configured with the system 10 may be designed and adapted to sense the moisture level of any plant growing media, communicate the readings to the controller 700, and trigger the controller 700 to move the carousel 202 to any desired position, in any direction, and at any speed to optimize the growing conditions for the plants.

In some embodiments, the lower portion of the carousel rotational pattern (e.g., at the ground level G) may place one or more platforms 204 at a level that is ergonomically correct for users of the system 10 to stand on the floor to work on the plants (e.g., for inspection, for trimming, for pruning, etc.). In some embodiments, the ground level platforms 204 may be accessible from all sides such that multiple workers may stand in different positions relative to the platform 204 while working. For example, the platform 204 may be positioned at about 2' to about 5' above the ground level G, and preferably about 3' to about 4' above the ground level G, and more preferably about 3.5' above ground level G.

In some embodiments, the lighting assembly 300 includes light modules 302 that may comprise any type(s) of desired lighting. For example, in some embodiments, the light modules 302 include one or more LED modules and/or LED strings. The light modules 302 are preferably located to the sides of the platforms 204, overhead, and below the platforms 204. In some embodiments, first panels of light modules 302 may extend horizontally overhead and below the platforms 204 and second panels of light modules 302 may extend vertically from the lower region of the carousel 202 to the upper region of the carousel 202. In this way, the plants may be exposed to 360° of light as desired (i.e., 360° of light penetration into the biomasses).

In some embodiments, the lighting modules 302 may be controlled by the controller 700 (or manually) to increase, decrease, or otherwise adjust the intensity of the output illumination as desired. For example, if one or more moisture sensors 212 sense that the plants are becoming too dry, the controller 700 may control particular lighting modules 302 to reduce in intensity for a desired period of time.

In some embodiments, the irrigation assembly 400 includes water drip irrigation modules 402 (drippers, drip emitters, etc.), water sprayers 404, and/or other types of water delivery devices (e.g., foggers, misters, etc.) integrated into the platforms 204, into the carousel 202, into the frame assembly 100, and/or into any location on the system 10 as required.

In some embodiments, the irrigation system 400 is controlled by the controller 700 (e.g., in partnership with the moisture sensors 212) to adjust the level and amount of irrigation that the plants may receive. In some embodiments, the plants may receive more irrigation in some carousel positions and less irrigation in others, and/or more irrigation at particular times of the day compared to other times.

In some embodiments, the irrigation system 400 includes a deep-water culture assembly 406 in a location (e.g., in a lower portion of the carousel rotation pattern such as at ground level G) that allows for the platforms 204 and plants to be submerged into the deep-water culture assembly 406 to be saturated. In some embodiments, the deep-water culture assembly 406 includes one or more ultraviolet lights adapted to maintain algae growth. In some embodiments, fertilizer, nutrients, and other materials may be added to the deep-water culture assembly 406 as desired.

In some embodiments, the heating, ventilation, and air conditioning (HVAC) assembly 500 includes a HVAC system with enough capacity to properly control the environment within the system 10. For example, in some embodiments, the HVAC assembly 500 may include a 25 ton system with four staged compressors built in and condensate recovered into DWC.

In some embodiments, the HVAC assembly 500 includes one or more supply lines 502 coupled with one or more airflow nozzles 504 to control the airflow within the system 10. In some embodiments, the airflow nozzles 504 are pointed upward to provide an upward flow of air throughout the system 10 as represented by the dashed arrow lines emanating from the airflow nozzles 504 in FIG. 1. It is understood that the airflow nozzles 504 may be pointed in any direction to cause airflow in any direction as well.

In some embodiments, the pest management assembly 600 includes one or more sprayers 602 adapted to spray any type of desired pest control materials onto the plants and growing media. In some embodiments, the sprayers 602 are integrated into the system 10 at a location to spray the plants when the plants are located in a lower portion of the carousel rotation pattern (e.g., at the ground level G and/or at the first level 1).

In some embodiments, the controller 700 may include any type of controller, such as, without limitation, a computer, a microprocessor, a microcontroller, a CPU, a mobile device, a cloud platform, other types of controllers, and any combinations thereof. Manual control and/or semi-automatic control (e.g., a combination of automatic control and manual control) also are contemplated.

In some embodiments, as shown in FIG. 3, the system 10 may perform at least some of the following actions 800:

At 802, a particular moisture sensor 212 configured with a particular plant on a particular platform 204 may sense the moisture level of the plant's growing media and communicate related moisture data to the controller 700.

At 804, the controller 700 may receive the moisture data and also determine the current location of the particular platform 204 within the carousel 202 (e.g., what level G, 1, 2, 3, . . . that the platform 204 is passing through).

At 806, the controller 700 may make a determination, based at least in part on the moisture data, the current location of the particular platform 204, and the current speed of the particular platform 204, to alter the position and/or speed of the platform 204 as described in other sections.

At 808, based at least in part on the determination made in 806, the controller 700 may cause the carousel 202 to move the particular platform 204 to a new position (e.g., to a new level G, 1, 2, 3, . . . ) and/or alter the speed of the particular platform 204.

Then, at 810, the controller 700 may trigger the particular treatment associated with the platform's new position. For example, if the platform 204 was moved to level 2, the plant associated with the platform 204 may receive irrigation, and if the platform 204 was moved to level 3, the plant may receive additional light, etc.

The process may then return to 802 and the controller 700 may receive updated moisture information from the particular moisture sensor 212 and the process may continue.

It is understood that the system 10 may take other actions not described above, may not perform all of the described actions, and may perform the actions in other orders.

It is understood that any aspect and/or element of any embodiment of the system 10 described herein or otherwise may be combined with any other aspect and/or element of any other embodiment described herein or otherwise in any way to form additional embodiments of the system 10 all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings.

Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A vertical plant cultivation system comprising:
    a vertical carousel;
    at least one platform coupled to the vertical carousel to be moved by the vertical carousel and adapted to hold at least one biomass;
    a controller;
    at least one moisture sensor configured to sense a moisture level of the at least one biomass and to communicate information based at least in part on the moisture level to the controller;
    an irrigation system configured with the vertical carousel; and
    a lighting system configured with the vertical carousel;
    wherein the controller controls a movement of the carousel based at least in part on the information received from the one or more moisture sensors;
    wherein when the information indicates a moisture level greater than a predefined value, the controller controls the carousel to move the at least one platform to the lighting system.

2. The vertical plant cultivation system of claim 1 further comprising a ground stage, a first stage, a second stage and a third stage, and wherein the carousel is adapted to move the at least one platform from the ground stage, to the first stage, to the second stage and to the third stage, wherein the first stage is above the ground stage, the second stage is above the first stage, and the third stage is above the second stage.

3. The vertical plant cultivation system of claim 2 wherein the irrigation system is located at the second stage and the lighting system is located at the third stage.

4. The vertical plant cultivation system of claim 3 wherein when the information indicates a moisture level greater than a predefined value, the controller controls the carousel to move the at least one platform to the third stage to receive light from the lighting system.

5. The vertical plant cultivation system of claim 3 wherein when the information indicates a moisture level greater than a predefined value, the controller controls the carousel to slow down as the at least one platform moves through the third stage to receive light from the lighting system.

6. The vertical plant cultivation system of claim 2 wherein the ground stage and/or the first stage includes a pest management system.

7. The vertical plant cultivation system of claim 2 wherein the ground stage includes a deep-water culture system.

8. The vertical plant cultivation system of claim 1 wherein the controller controls a direction of movement and/or a speed of the carousel based at least in part on the information received from the one or more moisture sensors.

9. The vertical plant cultivation system of claim 1 wherein when the information indicates a moisture level less than a predefined value, the controller controls the carousel to move the at least one platform to the irrigation system.

10. The vertical plant cultivation system of claim 9 wherein when the information indicates a moisture level less than a predefined value, the controller controls the carousel to slow down to a non-zero speed as the at least one platform moves through the irrigation system.

11. The vertical plant cultivation system of claim 9 wherein when the information indicates a moisture level greater than a predefined value, the controller controls the carousel to speed up as the at least one platform moves through the irrigation system.

12. The vertical plant cultivation system of claim 1 wherein when the information indicates a moisture level less than a predefined value, the controller controls the carousel to speed up as the at least one platform moves through the lighting system.

13. A method to irrigate a biomass comprising:
(A) providing a vertical carousel with at least one carousel platform and adapted to rotate at a speed;
(B) configuring a controller with the vertical carousel to control movement of the vertical carousel;
(C) placing the biomass on the at least one carousel platform;
(D) configuring a moister sensor with the biomass, the moister sensor adapted to sense a moister level of the biomass and to communicate information based at least in part on the moister to the controller;
(E) sensing a moister level of the biomass using the moister sensor;
(F) communicating the moister to the controller;
(G) determining, by the controller and based at least in part on the moister level, a movement of the vertical carousel; and
(H) using the controller to cause the vertical carousel to move according to the determined movement of (G).

14. The method of claim 13 wherein the determined movement of (G) includes increasing the speed of the carousel and/or decreasing the speed of the carousel.

15. The method of claim 13 wherein the vertical carousel is adapted to move the at least one carousel platform to a first location to receive irrigation and/or to a second position to receive light, and wherein the determined movement of (G) includes moving the at least one carousel platform to the first position and/or moving the at least one carousel platform to the second position.

16. The method of claim 15 further comprising:
(I) providing irrigation to the biomass at the first location and/or providing light to the biomass at the second location.

17. A vertical plant cultivation system comprising:
a vertical carousel;
at least one platform coupled to the vertical carousel to be moved by the vertical carousel and adapted to hold at least one biomass;
a controller;
at least one moisture sensor configured to sense a moisture level of the at least one biomass and to communicate information based at least in part on the moisture to the controller;
an irrigation system configured with the vertical carousel; and
a lighting system configured with the vertical carousel;
wherein the controller controls a movement of the carousel based at least in part on the information received from the one or more moisture sensors;
wherein when the at least one platform is moving through the irrigation system and the information indicates a moisture level less than a predefined value, the controller controls the carousel to slow down to a non-zero speed.

18. The vertical plant cultivation system of claim 17 wherein when the information indicates a moisture level greater than a predefined value, the controller controls the carousel to speed up.

* * * * *